(12) United States Patent
Badino et al.

(10) Patent No.: US 12,636,909 B2
(45) Date of Patent: May 26, 2026

(54) WHEEL UNIT WITH DISENGAGEABLE DRIVE FOR AN ELECTRIC VEHICLE

(71) Applicant: Stellantis Europe S.p.A., Turin (IT)

(72) Inventors: Renato Badino, Turin (IT); Oreste Bertini, Turin (IT)

(73) Assignee: Stellantis Europe S.p.A., Turin (IT)

( * ) Notice: Subject to any disclaimer, the term of this patent is extended or adjusted under 35 U.S.C. 154(b) by 67 days.

(21) Appl. No.: 18/850,308

(22) PCT Filed: Mar. 20, 2023

(86) PCT No.: PCT/IT2023/050083
§ 371 (c)(1),
(2) Date: Sep. 24, 2024

(87) PCT Pub. No.: WO2023/199365
PCT Pub. Date: Oct. 19, 2023

(65) Prior Publication Data
US 2025/0214372 A1 Jul. 3, 2025

(30) Foreign Application Priority Data

Apr. 14, 2022 (IT) ......................... 102022000007424

(51) Int. Cl.
*B60B 27/00* (2006.01)
*B60K 17/02* (2006.01)
(Continued)

(52) U.S. Cl.
CPC .......... *B60B 27/0021* (2013.01); *B60K 17/02* (2013.01); *B60K 17/3515* (2013.01);
(Continued)

(58) Field of Classification Search
CPC .. F16C 19/186; F16C 19/546; F16C 2326/02; F16D 2011/002; F16D 48/06;
(Continued)

(56) References Cited

U.S. PATENT DOCUMENTS

| | | | | | |
|---|---|---|---|---|---|
| 5,984,422 | A | * | 11/1999 | Seifert | B60B 27/001 |
| | | | | | 301/105.1 |
| 6,109,411 | A | * | 8/2000 | Bigley | B60K 17/354 |
| | | | | | 301/105.1 |

(Continued)

FOREIGN PATENT DOCUMENTS

WO 2006035836 A1 4/2006

OTHER PUBLICATIONS

EPO International Search Report and Written Opinion dated Jun. 5, 2023, based on PCT/IT2023/050083, 10 pages.

*Primary Examiner* — Phillip A Johnson
(74) *Attorney, Agent, or Firm* — Heslin Rothenberg Farley and Mesiti P.C.; Victor A. Cardona, Esq.

(57) ABSTRACT
A wheel unit with a disengageable drive for an electric vehicle has a wheel pin rotatably supported within a cylindrical wall of a central opening of the a wheel hub by a first rolling bearing, arranged on a portion of the wheel pin further away from a driven member (6, and by a second rolling bearing and a third rolling bearing set alongside one another, arranged on a portion of the wheel pin closer to the driven member. The first bearing and the second bearing have respective outer rings, mounted with interference fit within the cylindrical wall and respective inner rings rigidly mounted on the wheel pin and rigidly connected together by a spacer sleeve. The third bearing has a respective outer ring mounted with possibility of axial play between the second bearing and an annular shoulder of the wheel pin.

4 Claims, 10 Drawing Sheets

(51) Int. Cl.

| | |
|---|---|
| *B60K 17/35* | (2006.01) |
| *F16C 19/18* | (2006.01) |
| *F16C 19/54* | (2006.01) |
| *F16C 43/04* | (2006.01) |
| *F16D 48/06* | (2006.01) |
| *F16D 11/00* | (2006.01) |

(52) U.S. Cl.
CPC ............ *F16C 19/546* (2013.01); *F16C 43/04* (2013.01); *F16D 48/06* (2013.01); *F16C 2326/02* (2013.01); *F16D 2011/002* (2013.01)

(58) Field of Classification Search
CPC ............ B60B 27/0005; B60B 21/0026; B60B 21/0094; B60K 17/02; B60K 17/3515
USPC ....................................................... 192/69.4
See application file for complete search history.

(56) References Cited

U.S. PATENT DOCUMENTS

| | | | | |
|---|---|---|---|---|
| 6,336,537 | B1 | 1/2002 | Krisher et al. | |
| 6,390,221 | B2 * | 5/2002 | Goddard ............ | B60K 17/3515 |
| | | | | 180/247 |
| 6,422,369 | B1 * | 7/2002 | McCalla ............ | B60K 17/3515 |
| | | | | 301/105.1 |
| 2011/0291467 | A1 | 12/2011 | Severini et al. | |
| 2020/0094675 | A1 * | 3/2020 | Johnston .............. | B60K 17/356 |

* cited by examiner

Tecnica nota

WHEEL UNIT WITH DISENGAGEABLE DRIVE FOR AN ELECTRIC VEHICLE

CROSS REFERENCE TO RELATED APPLICATIONS

This application is a national stage filing under Section 371 of International Application No. PCT/IT2023/050083, filed Mar. 20, 2023, published in English on Oct. 19, 2023, as WO 2023/199365 A1 and which claims priority from Italian Patent Application No. 102022000007424 filed on Apr. 14, 2022, the entire disclosures of which are incorporated herein by reference.

FIELD OF THE INVENTION

The present invention relates to a wheel unit with disengageable drive for an electric vehicle, of the type comprising:
  a wheel support;
  a wheel hub rotatably supported by the wheel support;
  a wheel pin, rotatably mounted via rolling bearings within a cylindrical wall of a central opening of the wheel hub, wherein the wheel pin is carried by a rotatable member configured to be driven by an electric motor of the vehicle; and
  a coupling device for releasably connecting the aforesaid driven member with the wheel hub.

PRIOR ART

Solutions of the type referred to above have already been used in high-class battery electric vehicles (BEVs) that are equipped with two electric motors for driving the front wheels and the rear wheels, respectively. In four-wheel-drive electric vehicles of this type, the so-called eAWD (electric All-Wheel Drive) vehicles, two-axle drive is in general overabundant, but is, instead, useful when it is desired to exploit as much as possible the regenerative-braking capacity and consequent recharging of the battery or else for driving in limit conditions of road-holding of the tyres. To enable engagement and disengagement of a driving axle (normally the front axle) the corresponding wheel units are built according to the configuration referred to above. Thanks to the coupling device mentioned above, the member driven by the electric motor can be connected in rotation to, or else disconnected from, the wheel pin, according to the requirement of the driver, or else even automatically by the electronic controller of the vehicle, on the basis of the dynamic conditions detected. Passing from the all-wheel drive (AWD) condition to the rear-wheel drive (RWD) condition is moreover advantageous in so far as any passive resistance of the disengaged axle (axle shaft, differential, electric motor) is drastically reduced, to the complete advantage of autonomy of the vehicle battery.

FIG. 10 of the annexed drawings is a schematic cross-sectional view of a wheel unit with disengageable drive of a known type, for an electric vehicle with disengageable front-wheel drive.

In FIG. 10, the reference number 1 designates as a whole the body of a wheel hub that is rotatably mounted via a rolling bearing 2 within a hub-carrier member 3, which is in turn rigidly connected, for example by means of bolts, to a wheel support or knuckle 4.

The reference number 5 designates a wheel pin that is carried by a driven member 6 (typically a bell-shaped body of a constant-velocity joint) that is to be driven in rotation by the electric motor pre-arranged for driving the front wheels of the vehicle. Since the wheel unit envisages the possibility of disengagement of the connection in rotation between the driven member 6 and the wheel hub 1, the pin 5 is not rigidly connected in rotation to the wheel hub 1, as occurs in conventional permanent-drive solutions, but rather is rotatably mounted within the cylindrical wall 7 of the central opening of the wheel hub 1 via two rolling bearings 8, 9, set at an axial distance apart from one another. In this way, when the wheel hub 1 is not connected in rotation to the pin 5, and the electric driving motor is deactivated, the wheel hub 1 is free to turn about the pin 5, as in the case of any non-driving wheel.

To enable coupling in rotation, the body of the driven member 6 and the body of the wheel hub 1 carry ring gears 10, 11, adjacent to one another, which can both be engaged by the inner toothing of a ring 12 carried by the driven member 6 and axially displaceable via an actuator device (not illustrated in FIG. 10) between an inactive position, of engagement only with the ring gear 10 of the member 6, where the wheel hub 1 is disconnected from the driven member 6, and an active position, where the inner ring gear of the ring 12 meshes with both of the toothings 10, 11 so that the wheel hub 1 is connected in rotation to the driven member 6 and to the wheel pin 5. In the latter condition, the front electric motor of the vehicle can be activated to drive in rotation the wheel pin 5, and therewith the wheel hub 1. In this condition, the rolling bearings 8, 9 are stationary.

With reference once again to FIG. 10, the known solutions of the type referred to above that have been implemented so far envisage the use of a roller bearing 8, without inner ring, with the rollers in direct contact with the surface of the wheel pin 5 and a roller cage mounted within the cylindrical wall 7 of the central opening of the wheel hub 1. The rolling bearing 9 is a ball bearing.

The known solution described above entails a series of drawbacks. In the first place, the use of a roller bearing with rollers in direct contact with the wheel pin 5 renders the ensemble particularly exposed to malfunctioning following upon infiltration of water, mud, and dirt from outside (during assembly and disassembly, in the production stage and during maintenance). Moreover, the roller bearing 8 operates with relatively high and uncontrollable functional play that is the origin of noise and/or knocking. A further drawback lies in the fact that the two bearings 8, 9 require an operation of adjustment that must be performed in the production plant and that always entails the risk of not always managing to reach the condition of optimal operation in which the bearings should operate. Again a further drawback lies in the fact that the ball bearing 9 that is located on the end of the cylindrical wall 7 facing outwards must be provided with a specific seal against infiltration of water, mud, and dirt, with consequent increase in the passive resistance deriving from this sealing device. Again, the entire ensemble described above also envisages application of grease in the production plant, which once again entails complications in the production stage and the risk of defects deriving from application of an incorrect amount of grease.

In view of the foregoing, there is consequently felt the need for a solution that will overcome the drawbacks referred to above and that in particular will simplify the operations to be carried out in the production plant.

A wheel unit of the type referred to in the preamble of claim 1 is known from WO 2006/035836 A1.

A solution to the problems set forth above has formed the subject of the Italian patent application IT 10 2021 00000 8579 and the corresponding European patent application EP 22156267, neither of which has yet been published at the date of the present patent application. In this solution, the wheel pin is rotatably mounted within the central opening of the wheel hub via two rolling bearings, set at an axial distance apart from one another. These rolling bearings have respective outer rings mounted with interference fit within the central opening of the wheel hub, and respective inner rings rigidly mounted on the wheel pin and rigidly connected together by means of a spacer sleeve so that the unit constituted by the wheel hub, the rolling bearings, and the spacer sleeve can be assembled before being mounted on the wheel pin.

Studies and experiments conducted by the present applicant have shown that in the case of transmission of very high engine torques, the rolling bearing on the inner side of the hub is particularly overloaded on account of the overload applied by the member driven by the motor that carries the wheel pin (typically the wheel-side portion of a constant-velocity joint), to the disadvantage of the life of the device and with generation of very high noise and rolling resistance. The aim of the present invention is to improve the above solution.

OBJECT OF THE INVENTION

An object of the present invention is consequently to provide a wheel unit of the type described above that will make it possible to deactivate the drive on the wheel, drastically reducing any passive resistance of the disconnected axle (axle shaft, differential, electric motor), to the entire advantage of autonomy of the battery of the electric vehicle, and that at the same time will overcome the drawbacks of the known solutions.

In particular, an object of the invention is to simplify the operations to be carried out in the production plant, envisaging the possibility of (off-line) pre-assembly of a wheel-hub unit that can then be mounted with a simple operation on the wheel knuckle in the production plant, without requiring complex operations of adjustment and setting-up.

A further object of the invention is to provide a wheel unit of the type specified above that will always present proper and reliable operation.

Yet a further object of the invention is to provide a wheel unit of the type specified above that will not be exposed to the risk of malfunctioning on account of infiltration of water, mud, or dirt.

Finally, a further object of the invention is to achieve all the aforesaid aims with a wheel unit that will be of relatively simple and low-cost construction.

SUMMARY OF THE INVENTION

With a view to achieving one or more of the aforesaid objects, the subject of the invention is a wheel unit with disengageable drive for an electric vehicle, comprising:
   a wheel support;
   a wheel hub rotatably supported by the wheel support; and
   a wheel pin rotatably supported, by means of rolling bearings, within a cylindrical wall of a central opening of the wheel hub, wherein the wheel pin is carried by a rotatable member configured to be driven by an electric motor of the vehicle; and
   a coupling device for releasably connecting the aforesaid driven member to the wheel hub,
   said wheel unit being characterized in that:
   the rolling bearings that rotatably support the wheel pin within the central opening of the wheel hub comprise:

a first rolling bearing, arranged on a portion of the wheel pin further away from said driven member; and
   a second rolling bearing and a third rolling bearing, set alongside one another, arranged on a portion of the wheel pin closer to said driven member;
   the second rolling bearing being on the side facing the first rolling bearing and being set at an axial distance from the first rolling bearing,
   and wherein moreover:
   said first rolling bearing has a respective outer ring, mounted with interference fit within said cylindrical wall of the central opening of the wheel hub, against an annular shoulder of said cylindrical wall facing the outer side of the wheel hub;
   said second rolling bearing has a respective outer ring, mounted with interference fit within said cylindrical wall of the central opening of the wheel hub, against an annular shoulder of said cylindrical wall facing the inner side of the wheel hub;
   the first rolling bearing and the second rolling bearing have respective inner rings rigidly mounted on said wheel pin and rigidly connected together by means of a spacer sleeve that has a predetermined length, which is a function the axial distance between said annular shoulders;
   the third rolling bearing has a respective outer ring mounted with possibility of axial play between the second rolling bearing and an annular shoulder of the wheel pin;
   set between the second rolling bearing and the third rolling bearing is a spring washer, tending to push axially the outer ring of the third rolling bearing against said annular shoulder of the wheel pin; and
   said wheel hub with said first, second, and third rolling bearings and said spacer sleeve forming a hub unit that can be assembled separately before being mounted on said wheel pin.

Thanks to the prearrangement of two rolling bearings on the side closer to the member driven by the motor that carries the wheel pin, there is obtained sharing of the load applied by the driven member between the two bearings, and hence a reduction of the stress, to the entire advantage of service life and of reduction of rolling resistance and noise.

According to a further characteristic, associated to the cylindrical wall of the central opening of the wheel hub is a stop ring configured and arranged to prevent said third rolling bearing from separating from said hub unit before the unit is mounted on the wheel pin.

DETAILED DESCRIPTION OF A PREFERRED EMBODIMENT

Further characteristics and advantages of the invention will emerge from the ensuing description with reference to the annexed drawings, which are provided purely by way of non-limiting example and in which.

Figure 8:
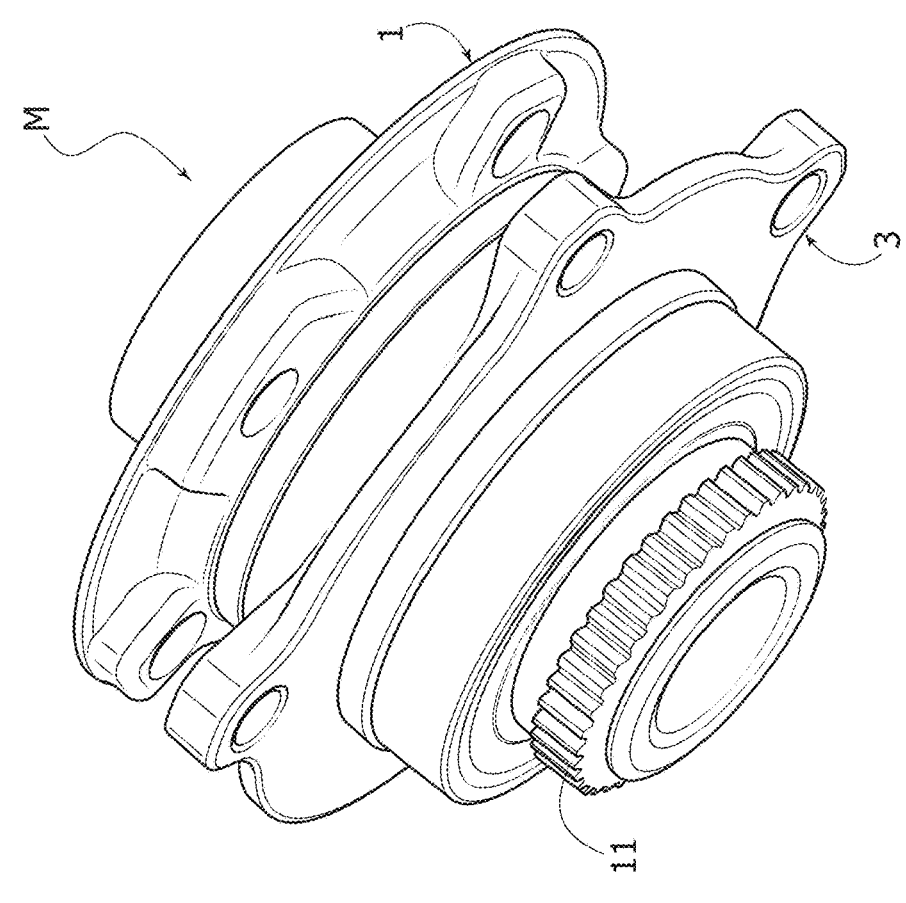
Figure 9:
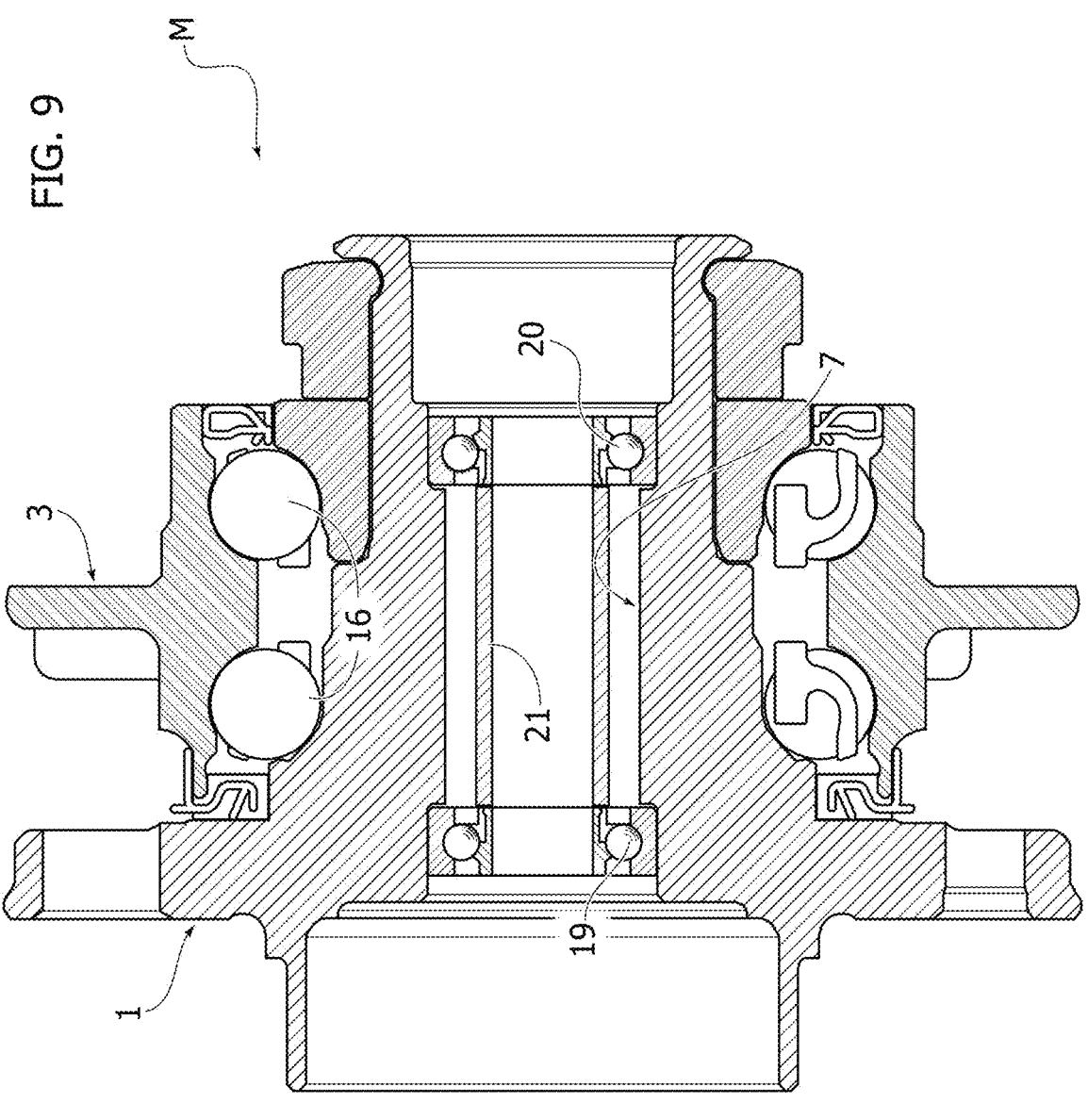
Figure 10:
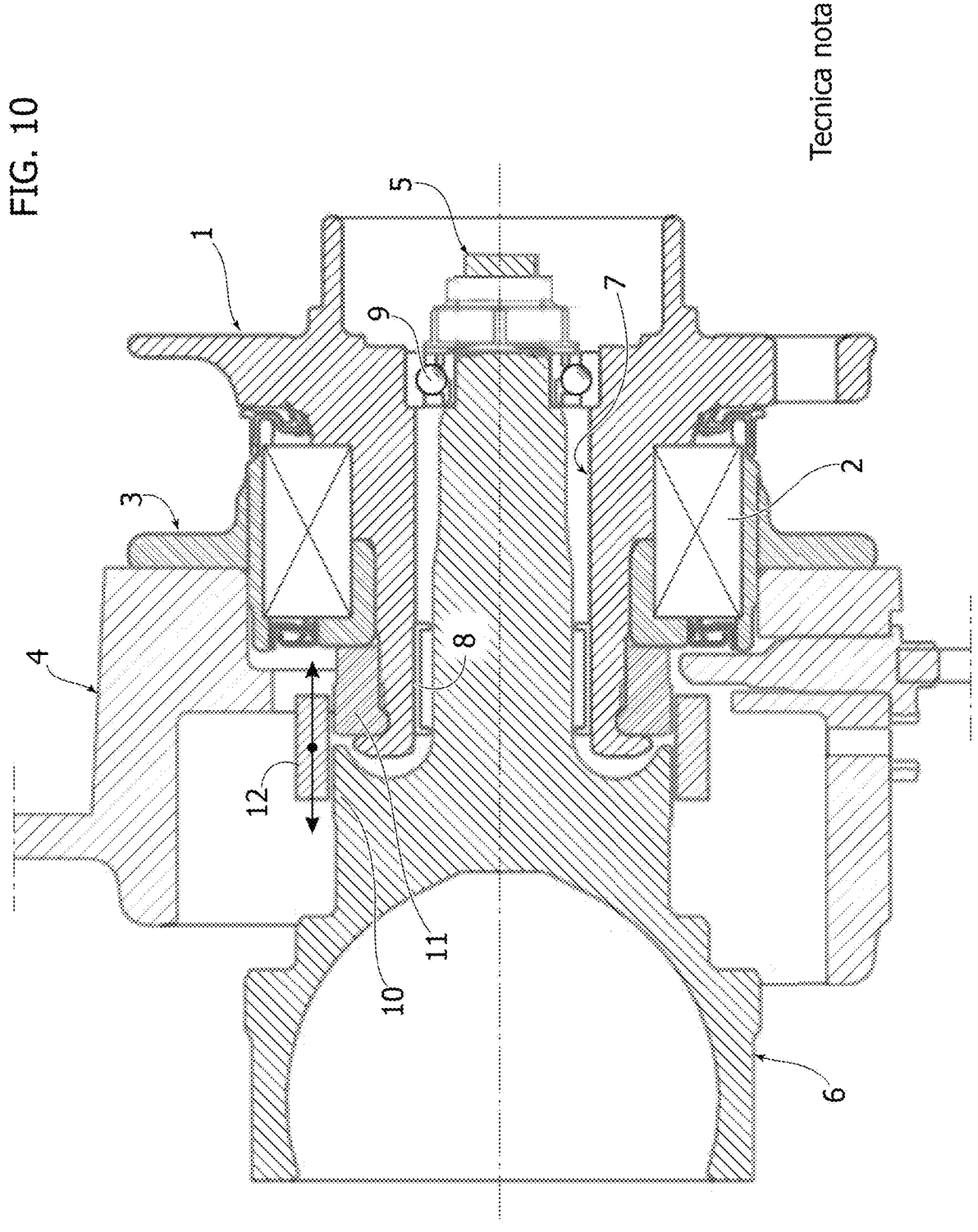
FIG. 10 is a partial schematic cross-sectional view of a wheel unit according to the prior art.

In FIGS. 1-9, the parts in common with, or corresponding to, the ones illustrated in FIG. 10, regarding the prior art already described above, are designated by the same reference numbers. FIGS. 1-9 refer to an embodiment that does not form part of the present invention in so far as it is already described in the prior Italian patent application IT 10 2021 00000 8579 and in the corresponding European patent application EP 22156267. However, the description of these figures is useful for an understanding of the present invention.

Figure 1:
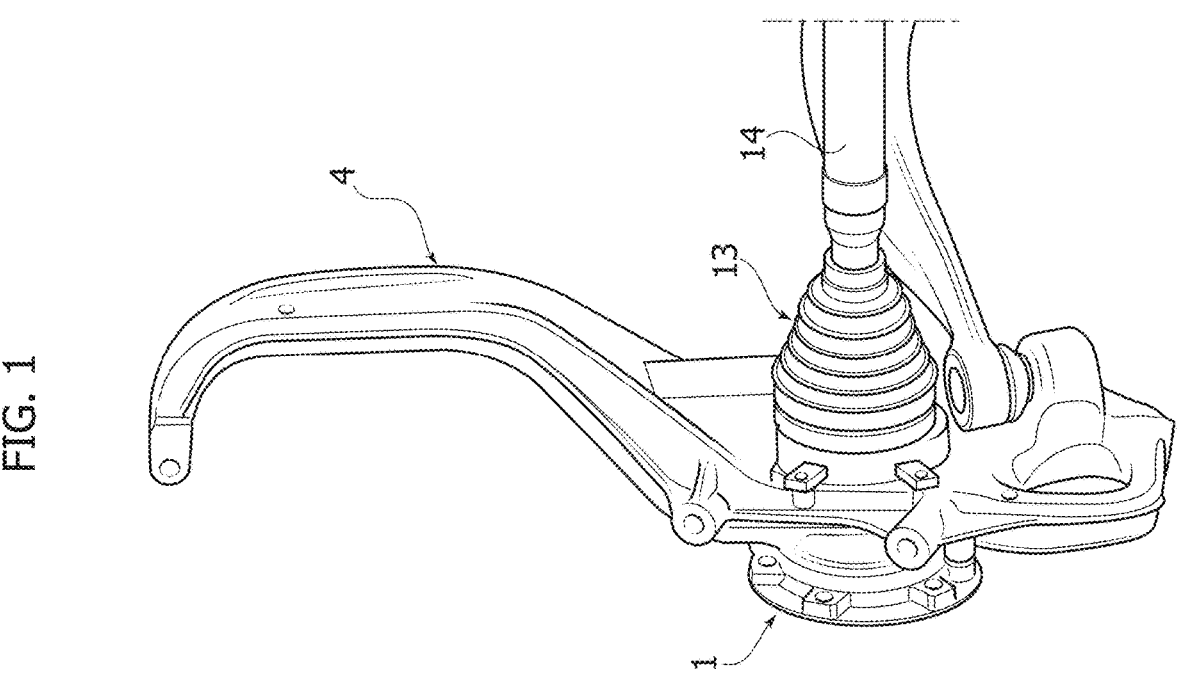
FIG. 1 is a perspective view of a front steering-wheel unit of a conventional type, with a wheel support or knuckle that rotatably supports a wheel hub, which is permanently connected in rotation to an axle shaft driven by an electric motor of the vehicle.

FIG. 1 shows a conventional wheel unit, in which a wheel hub 1 is rotatably supported by a wheel support or knuckle 4 and is permanently connected in rotation, via a constant-velocity joint 13, with an axle shaft 14 driven by a front electric motor of the vehicle (not illustrated). The example of FIG. 1 refers in fact to a front-wheel unit, in which the wheel knuckle 4 is supported in an oscillating way about a steering axle of the wheel, by means of members of the suspension of the vehicle. Both in FIG. 1 and in FIGS. 2-9, the suspension members to which the wheel knuckle 4 is connected are not illustrated since they can be obtained in any known way and also in so far as, taken in themselves, they do not fall within the scope of the present invention.

As already referred to above, the wheel unit according to the invention is of the type with disengageable drive for an electric vehicle that is to operate both with a first electric motor that is permanently connected to a steering-wheel axle (typically the rear axle) and with a second electric motor that is releasably connected to the hubs of the front wheels.

Figure 2:
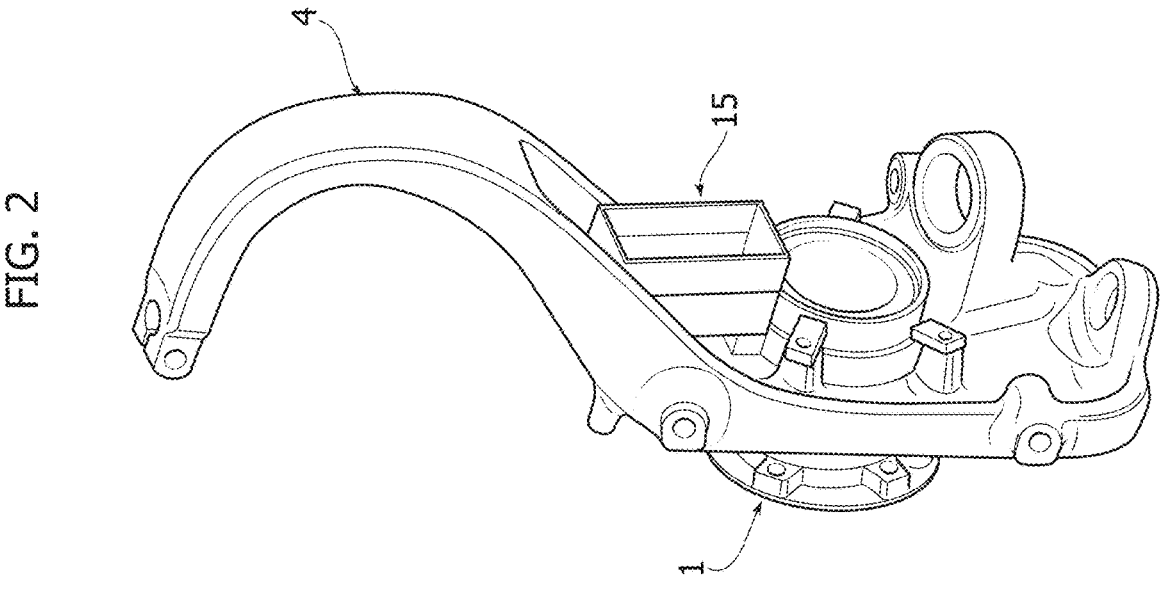
FIGS. 2-9 illustrate an embodiment of a wheel unit not forming part of the present invention, corresponding to the solution that formed the subject of the Italian patent application IT 10 2021 00000 8579 and of the corresponding European patent application EP 22156267.

FIG. 2 shows an example of wheel knuckle 4 of a front steering wheel, with a wheel hub 1, which is rotatably supported by the wheel knuckle 4, and a coupling device 15, described in detail in what follows, which is carried by the wheel knuckle 4 and is pre-arranged for selectively connecting in rotation the wheel hub 1 to the driven member of the constant-velocity joint 13 (not illustrated in FIG. 2), which is in turn connected to the axle shaft 14 (not illustrated either in FIG. 2).

Figure 3:
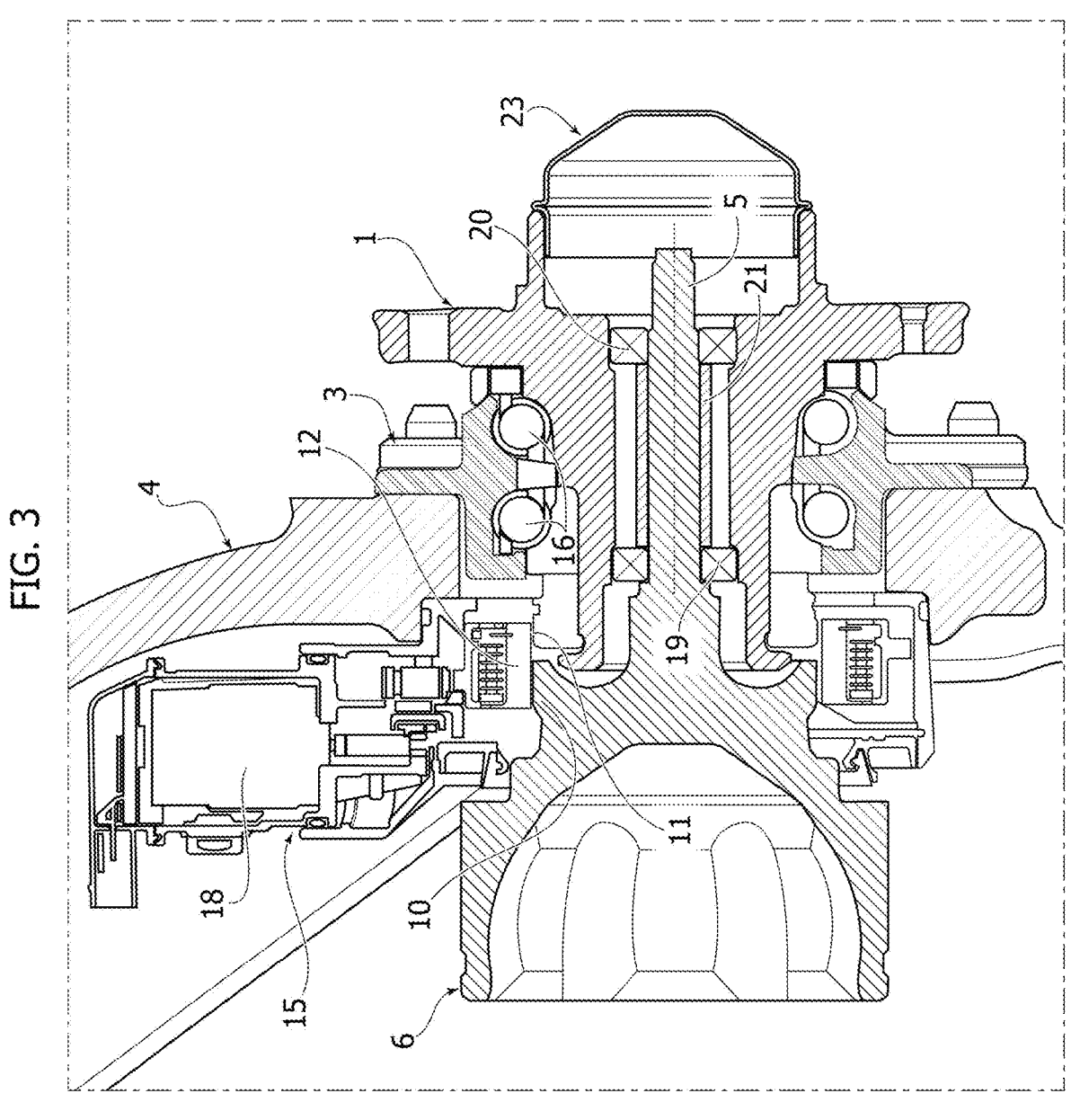
Figure 4:
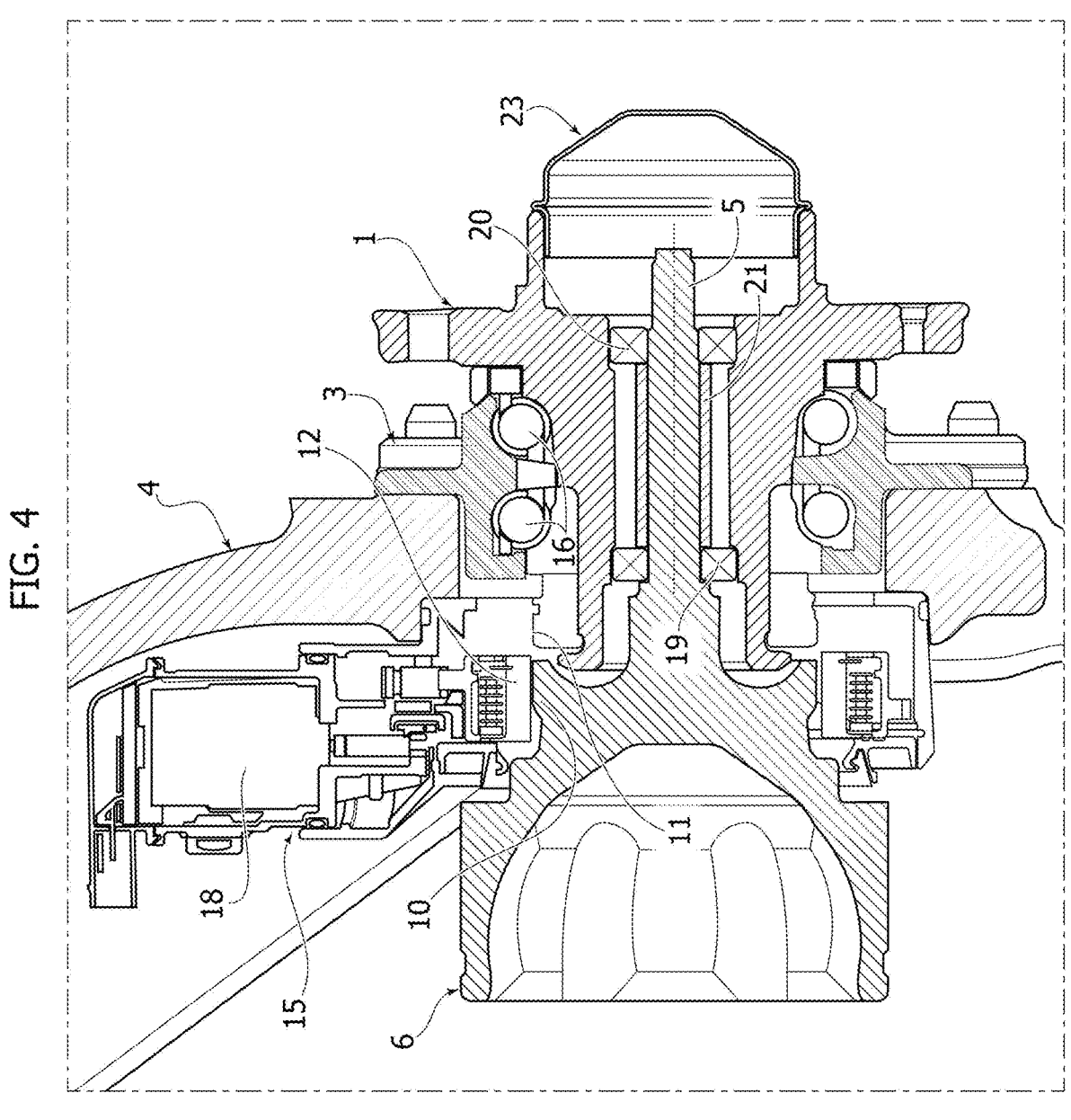
Figure 5:
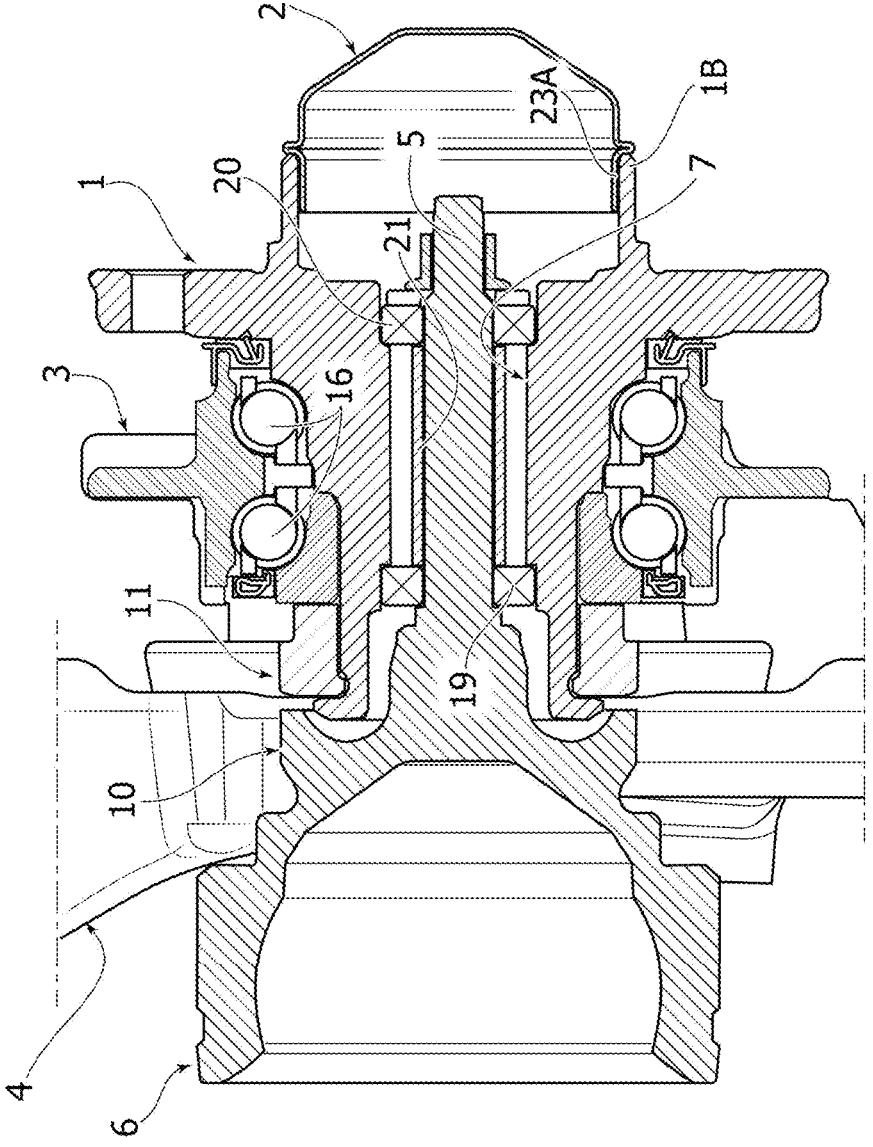

With reference to FIGS. 3, 4 and 5, in the example of embodiment illustrated herein, the wheel hub 1 is rotatably supported, by means of a double ring of balls 16, by a hub-carrier member 3, which is rigidly connected (typically by means of bolts) to the body of the wheel knuckle 4. It should be noted that the specific configuration of the wheel knuckle 4, of the hub-carrier member 3, of the body of the wheel hub 1, as well as of the rolling bearing constituted by the double ring of balls 16, is illustrated herein purely by way of example, it being possible to obtain such components in any other known way.

The driven member 6 of the constant-velocity joint has a shank constituting the wheel pin 5. As in the case of the known solution illustrated in FIG. 10, the body of the driven member 6 and the body of the wheel hub 1 carry ring gears 10, 11 adjacent to one another, which can be connected together in rotation following upon meshing with the inner toothing by a slide ring 12 (see FIGS. 3 and 4). FIGS. 3 and 4 also show schematically the actuator device 15, comprising an electric motor 18 that drives, in a way in itself known, by means of a mechanical transmission of any type, axial movement of the ring 12. The details of construction regarding the mechanism controlled by the electric motor 18 are not described nor illustrated herein both in so far as they can be obtained in any known way and in so far as, taken in themselves, they do not fall within the scope of the present invention.

FIG. 3 shows the operating condition in which the ring 12 has its inner ring gear that meshes with both of the ring gears 10, 11, whereas FIG. 4 shows the operating condition in which the slide ring 12 is engaged only with the ring gear 10. Consequently, in the condition of FIG. 3, the driven member 6 is connected in rotation to the wheel hub 1, whereas in the condition of FIG. 4 the driven member 6 is uncoupled from the wheel hub 1, which is hence free to rotate on the wheel pin 5.

Figure 6:
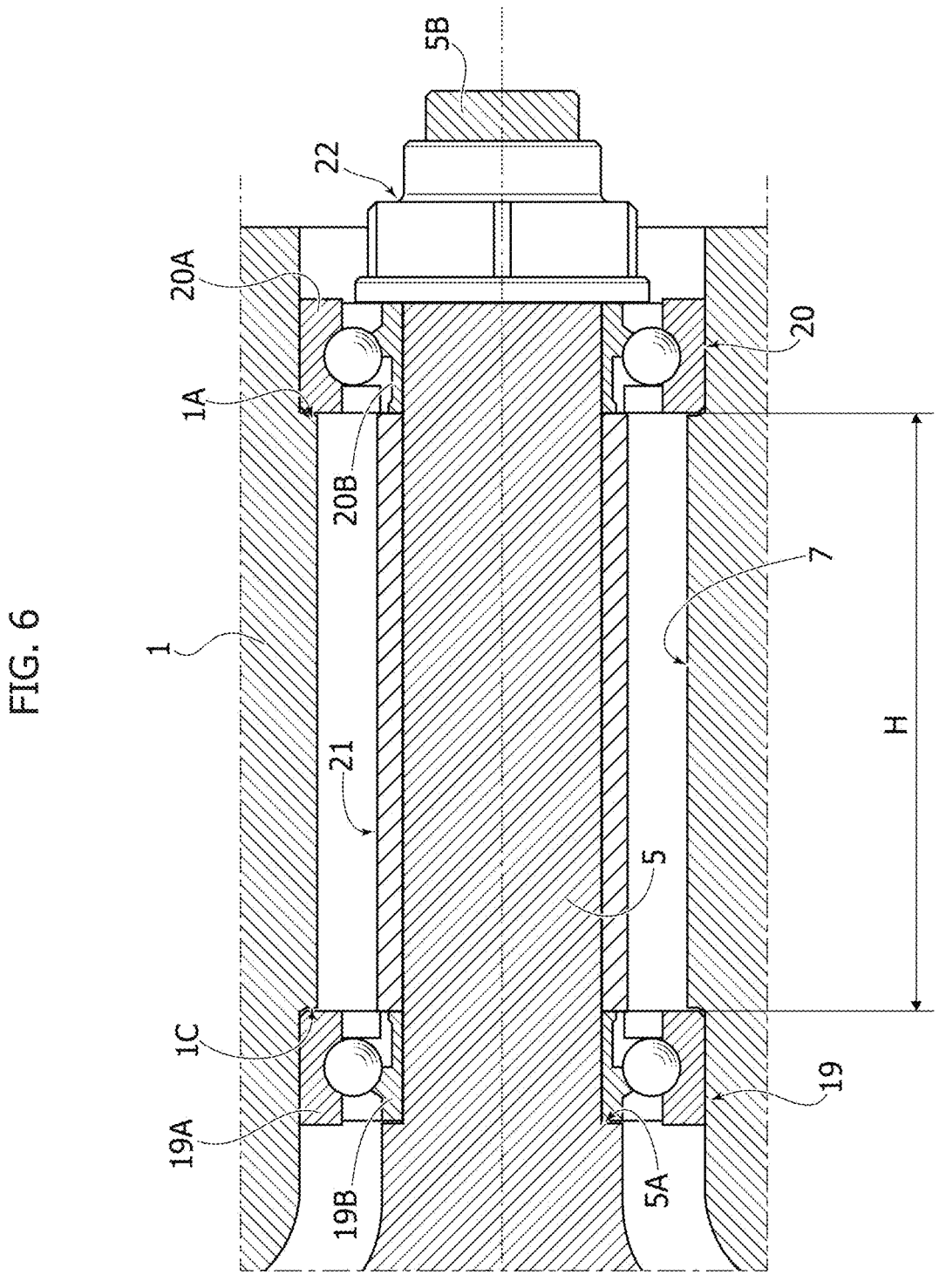

With reference in particular to FIGS. 5 and 6, rotatable support of the wheel hub 1 on the wheel pin 5 is obtained by means of two rolling bearings 19, 20, which, in the preferred example are both ball bearings, with a single ring of balls. The two ball bearings 19, 20 have outer rings 19A, 20A, which are mounted so as to bear upon respective annular shoulders 1A, 1C that face the opposite ends of the cylindrical wall 7 of the central opening of the wheel hub 1 and are defined by widened end portions of the aforesaid wall.

The ball bearings 19, 20 moreover have respective inner rings 19B, 20B that are mounted on the wheel pin 5.

Set between the inner rings 19B, 20B of the two ball bearings 19, 20 is a spacer sleeve 21, preferably made of steel, having a length that is rigorously predetermined as a function of the axial distance H between the two shoulders 1A, 1C taking into account the configuration of the two bearings 19, 20. In the example, the length of the sleeve 21 is equal to the distance H.

Figure 7:
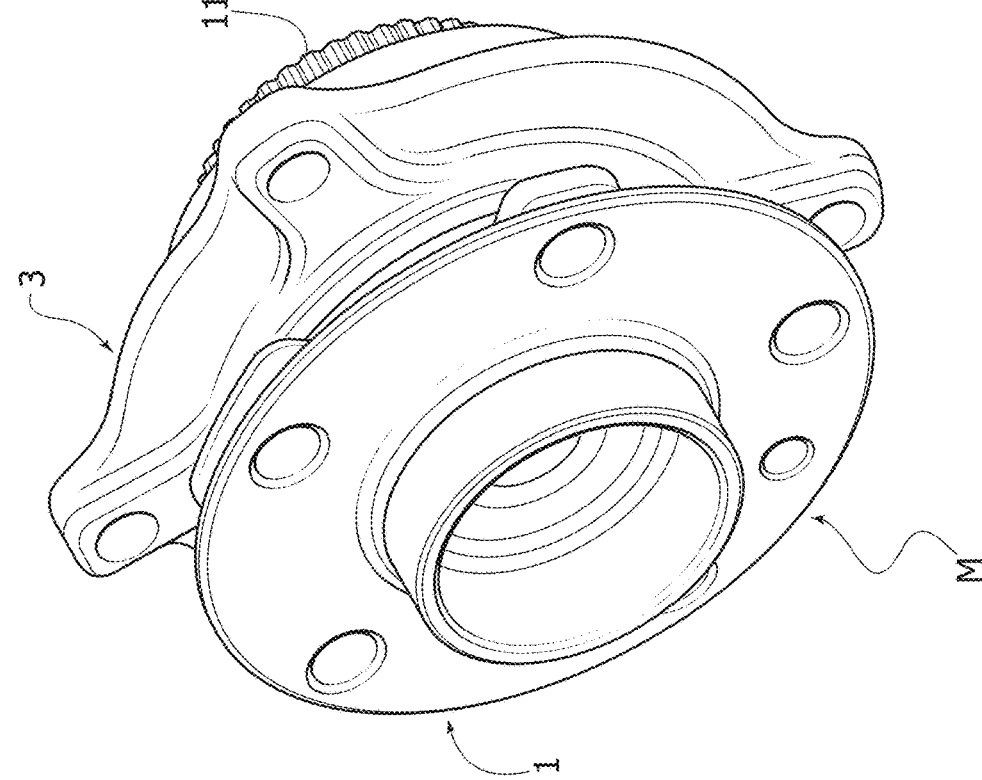

The spacer sleeve 21 is rigidly connected, for example via a crimping operation, to the inner rings 19B, 20B of the two bearings 19, 20. Consequently, the unit of the hub 1, denoted as a whole in FIG. 9 by the reference M, which includes the hub-carrier member 3, the body of the hub 1 rotatably mounted within the hub-carrier member 3 by means of the bearing including the double ring of balls 16, the two rolling bearings 19, 20, with their outer rings mounted with interference fit within the cylindrical wall 7, their inner rings and corresponding balls, as well as with the spacer sleeve 21 rigidly connected to the inner rings of the bearings 19, 20, can be preassembled off line and be mounted in a single operation on the wheel pin 5 in the production plant. During the above assembly step, the two bearings 19, 20 with the spacer sleeve 21 are fitted on the wheel pin 5 until the rolling bearing 19 that is further away from the free end of the wheel pin 5 is brought up against an annular shoulder 5A (FIG. 6) defined by a portion of enlarged diameter of the pin 5 (FIG. 6). FIGS. 7 and 8 show two perspective views of the hub unit M of FIG. 9, before it is mounted on the wheel pin.

With reference once again to FIG. 6, once the hub unit M is mounted on the wheel pin 5, it is axially blocked by screwing a nut 22 on a threaded portion 5B of the wheel pin 5. Tightening of the nut 22 brings the ensemble constituted by the inner rings 19B, 20B of the two bearings 19, 20, with the spacer sleeve 21, to be pressed axially against the annular shoulder 5A of the driven member 6.

Consequently, the final operation of assembly of the hub unit can be performed in a fast and efficient way, with the certainty of obtaining proper operation of the wheel unit, without any need for complex adjustment operations.

A further important characteristic lies in the fact that on the body of the hub 1 a cover 23 is rigidly mounted, in order to protect and isolate from the external environment the central opening of the hub 1 in which the bearings 19, 20 are mounted, thus preventing any infiltration of water, mud, or dirt. Preferably, the cover 23 is made of metal material so as to perform also a function of protection against impact.

In the example illustrated (see FIG. 5), the body of the hub 1 includes a cylindrical wall 1B projecting axially from the end surface of the hub 1 on which the cylindrical wall 7 emerges. Once again in this example, the cover 23 is in the form of dome-shaped element of sheet metal, with a circumferential wall 23A that is mounted with interference fit within the cylindrical wall 1B. Of course, any other configuration of the cover 23 is possible, as likewise may be the technique for rigidly connecting in a removable way the cover 23 to the body of the hub 1.

Figure 11:
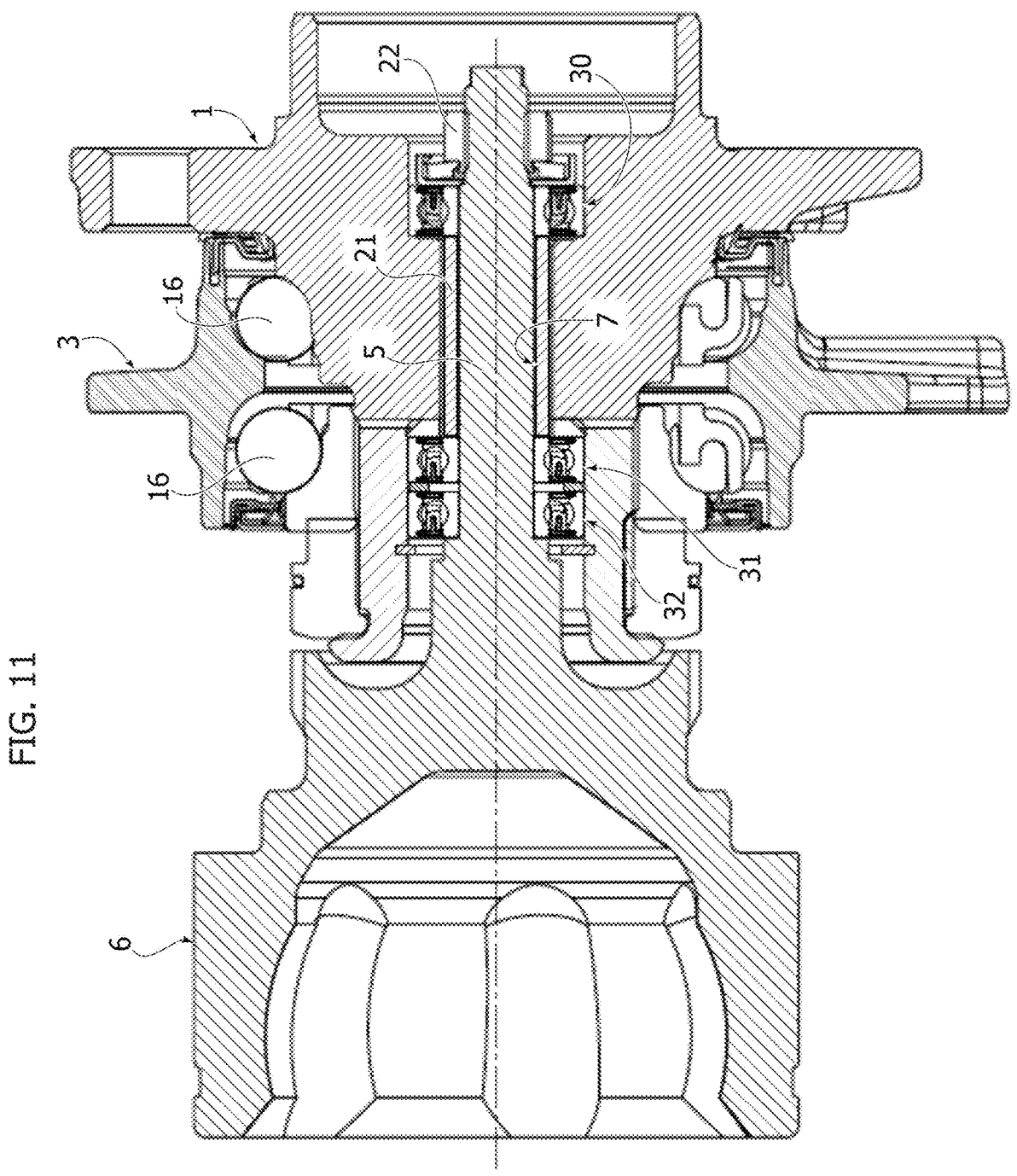
FIGS. 11, 12 are cross-sectional views that show a preferred embodiment of the present invention.
Figure 12:
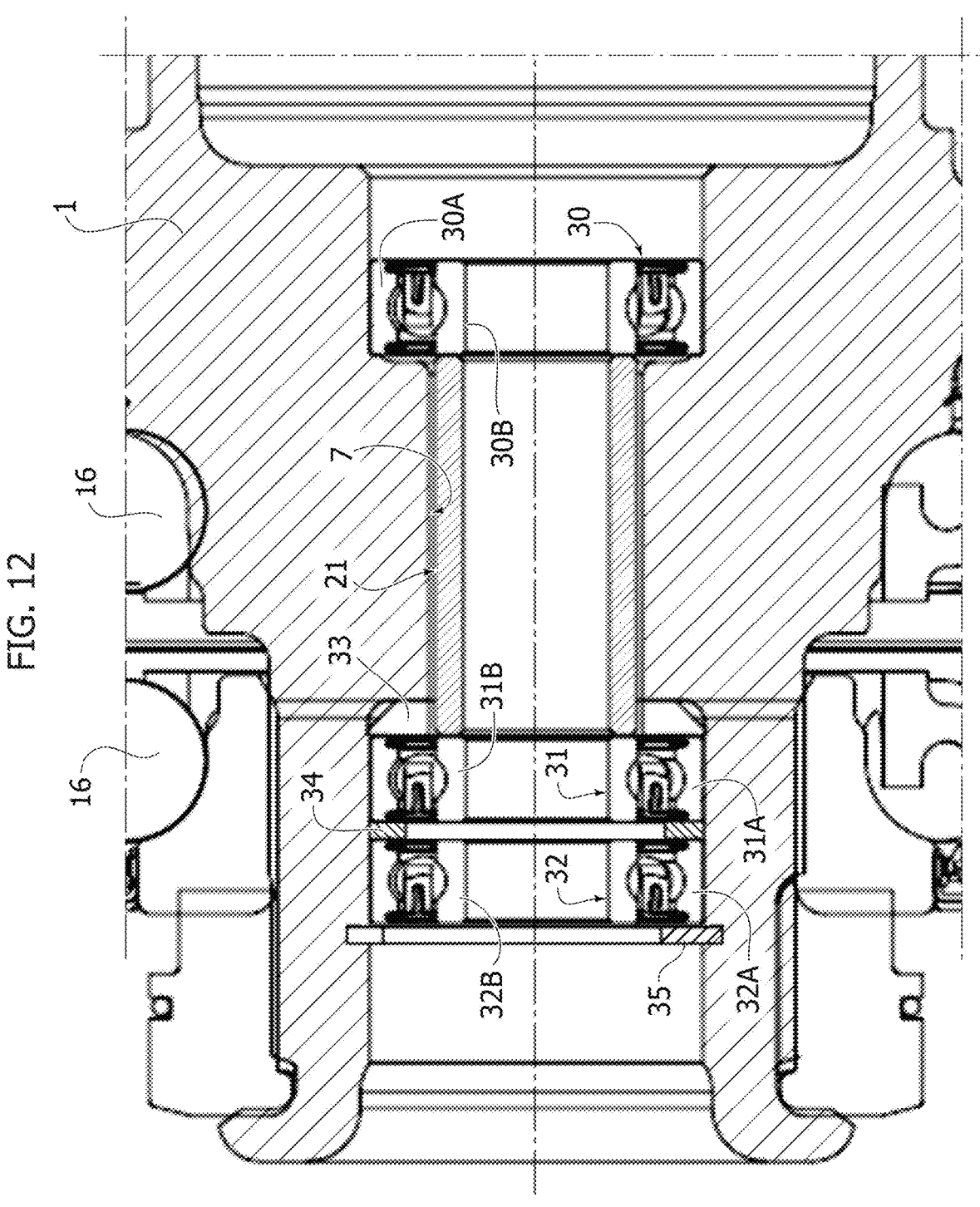

FIGS. 11 and 12 are variants, respectively, of FIGS. 5 and 9, which show a preferred embodiment of the present invention. Where not otherwise specified, the parts common to FIGS. 5 and 9 are designated by the same reference numbers.

The main difference with respect to the solution of FIGS. 5 and 9 lies in the fact that, instead of the two rolling bearings 19, 20, in the solution according to the present invention, three rolling bearings 30, 31, 32 are provided, which in the example illustrated are ball bearings.

A first rolling bearing 30 is arranged on the portion of the wheel pin 5 further away from the driven member 6, whereas a second rolling bearing 31 and a third rolling bearing 32 are set alongside one another and arranged on a portion of the wheel pin 5 closer to the driven member 6. The second rolling bearing 31, arranged on the side facing the first rolling bearing 30, is set at an axial distance from the first rolling bearing 30.

Like the solution of FIGS. 2-9, the first rolling bearing 30 has a respective outer ring 30A mounted with interference fit within the cylindrical wall 7 of the central opening of the wheel hub 1, against the annular shoulder 1A of said cylindrical wall 7 facing the outer end of the wheel hub 1.

Once again like the solution of FIGS. 2-9, the second rolling bearing 31 has a respective outer ring 31A mounted with interference fit within the cylindrical wall 7 of the central opening of the wheel hub 1, against the annular shoulder 10 of said cylindrical wall 7 facing the inner end of the wheel hub 1.

Once again like the solution of FIGS. 2-9, the first rolling bearing 30 and the second rolling bearing 31 have respective inner rings 308, 318 rigidly mounted on the wheel pin 5 and rigidly connected together by means of a spacer sleeve 21 that has a predetermined length, which is a function the axial distance between the annular shoulders 1A, 1C.

The third rolling bearing 32 that is provided according to the present invention has a respective outer ring 32A mounted with possibility of axial play between the second rolling bearing 31 and an annular shoulder of the wheel pin 1. Moreover, set between the second rolling bearing 31 and the third rolling bearing 32 is a spring washer, which tends to push axially the outer ring 32A of the third rolling bearing 32 against said annular shoulder 35 of the wheel pin 5. The washer 34 may be of any known type. For example, it may be constituted by a corrugated elastic metal sheet, which in the undeformed condition has a maximum axial dimension.

As in the solution of FIGS. 2-9, the wheel hub 1 with the three rolling bearings 30, 31, 32 and the spacer sleeve 21 forms a hub unit M (illustrated in FIG. 12), which can be assembled separately before being mounted on the wheel pin 5.

As may be seen in FIG. 12, which illustrates the hub unit M before being mounted on the pin 5, associated to the cylindrical wall 7 of the central opening of the wheel hub 1 is a stop ring 35 configured and arranged to prevent the third rolling bearing 32 from separating from the above hub unit M before the unit itself is mounted on the wheel pin 5. In the example, the stop ring is a broken elastic ring mounted in a circumferential slot in the wall 7.

With reference to FIG. 11, when the hub unit M is mounted on the pin 5, the rolling bearing 32 sets itself against the annular shoulder 1A of the pin 5 (moving away slightly from the stop ring 35) and is kept up against the annular shoulder 1A by the elastic reaction of the ring 34. In this way, the bearing 32 sets itself automatically in the correct position.

The prearrangement of two bearings 31, 32 for supporting the wheel pin on the side closer to the driven member 6 enables the loads applied by the driven member 6 to be shared between these two bearings. As already mentioned, in this way, service life of the device is increased, and a reduction of noise and of rolling resistance is obtained.

Except for the characteristics indicated above, the embodiment of FIGS. 11 and 12 is identical to that of FIGS. 2-9, including in particular everything that regards assembly of the spacer sleeve 21 and assembly of the cover 23.

Of course, without prejudice to the principle of the invention, the details of construction and the embodiments may vary widely with respect to what has been described and illustrated herein purely by way of example, without thereby departing from the scope of the present invention, as this is defined in the annexed claims.

The invention claimed is:

1. A wheel unit with a disengageable drive for an electric vehicle, comprising:
   a wheel support;
   a wheel hub rotatably supported by the wheel support; and
   a wheel pin rotatably supported, by means of rolling bearings, within a cylindrical wall of a central opening of the wheel hub, wherein the wheel pin is carried by a rotatable member configured to be driven by an electric motor of the vehicle; and
   a coupling device for releasably connecting said rotatable member to the wheel hub,
   wherein
   the rolling bearings that rotatably support the wheel pin within the central opening of the wheel hub comprise:
   a first rolling bearing, arranged on a portion of the wheel pin further away from said rotatable member;
   a second rolling bearing and a third rolling bearing set alongside one another, arranged on a portion of the wheel pin closer to said rotatable member;
   the second rolling bearing being on the side facing the first rolling bearing and being set at an axial distance from the first rolling bearing,
   said first rolling bearing has a respective outer ring, mounted with interference fit within said cylindrical wall of the central opening of the wheel hub, against an annular shoulder of said cylindrical wall facing the outer end of the wheel hub,
   said second rolling bearing has a respective outer ring, mounted with interference fit within said cylindrical wall of the central opening of the wheel hub, against an annular shoulder of said cylindrical wall facing the inner end of the wheel hub,
   the first rolling bearing and the second rolling bearing have respective inner rings rigidly mounted on said wheel pin and rigidly connected together by means of a spacer sleeve that has a predetermined length, which is a function of the axial distance between said annular shoulders;

the third rolling bearing has a respective outer ring mounted with possibility of axial play between the second rolling bearing and an annular shoulder of the wheel pin;

set between the second rolling bearing and the third rolling bearing is a spring washer, which tends to push the outer ring of the third rolling bearing axially against said annular shoulder of the wheel pin; and said wheel hub with said first, second, and third rolling bearings and said spacer sleeve forms a hub unit that can be assembled separately before being mounted on said wheel pin.

2. The wheel unit according to claim 1, further comprising a stop ring associated to the cylindrical wall of the central opening of the wheel hub, the stop ring configured and arranged to prevent said third rolling bearing from separating from said hub unit before the hub unit is mounted on the wheel pin.

3. The wheel unit according to claim 2, wherein the stop ring is an elastic ring mounted in a circumferential groove of the cylindrical wall of the central opening of the hub.

4. The wheel unit according to claim 1, wherein the outer ring of said second rolling bearing is mounted against the respective annular shoulder with interposition of a spacer ring.

* * * * *